Patented Apr. 29, 1947

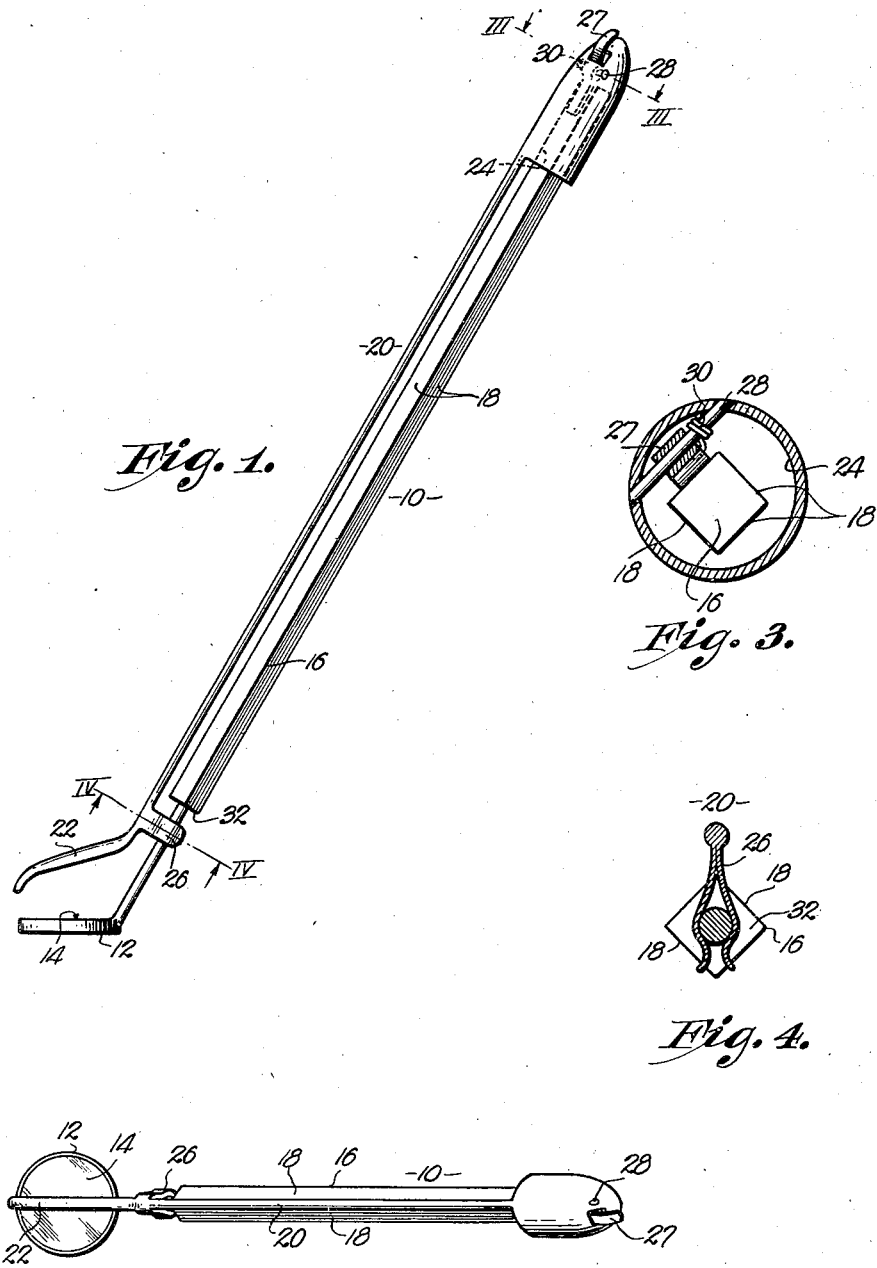

2,419,733

UNITED STATES PATENT OFFICE 2,419,733

DENTAL MIRROR AND GUARD ASSEMBLY

Eben L. Scott, Mission, Kans.

Application December 29, 1945, Serial No. 638,161

5 Claims. (Cl. 32—69)

This invention relates to surgical instruments of the character usually employed by dentists and has for its primary aim the provision of a dental mirror assembly having a guard adjustable with respect to the reflecting surface of the mirror to hold any part of the body away from the said reflecting surface while the mirror is in use.

One of the primary aims of this invention is the provision of a dental mirror and guard assembly having a head that carries a reflecting surface and an over-hanging finger swingably carried by a portion of the mirror for adjustment and movement across the surface of the mirror in spaced relation thereto.

A still further aim of this invention is to provide a guard for dental mirrors that may be conveniently and easily associated with the mirror per se in a fashion to cause a portion of the guard to be positioned in spaced relation with the reflecting surface of the mirror and for swinging movement thereabove to guard the same against coming into contact with any part of the body when the instrument is in use.

Other objects of the invention include the unique structure provided for interconnecting the mirror and guard and the novel parts for selectively holding the guard in any one of a number of positions with respect to the mirror head.

Further aims of the invention will appear during the course of the following specification referring to the accompanying drawing, wherein:

Fig. 1 is a side elevational view of a dental mirror and guard assembly made pursuant to the present invention.

Fig. 2 is a top plan view of the same.

Fig. 3 is a cross sectional view taken on line III—III of Fig. 1, and

Fig. 4 is a fragmentary cross sectional view on an enlarged scale taken on line IV—IV of Fig. 1.

The problem which this assembly is designed to solve is that of maintaining parts of the mouth and cheek away from the reflecting surface of the head of the conventional dental mirror when said mirror is in use. Heretofore some positions of the dental mirror have been such that the operator could not manipulate instruments and the mirror simultaneously because the mirror is covered by folds or portions of the cheek which obscure the view and preclude proper action. Heretofore dentists have simply held adjacent portions of the cheek away from the reflecting surface of the head of the dental mirror but this separate manual operation requires the use of fingers that may otherwise be employed in handling instruments with the dental mirror in place.

The guard which I have devised is easily associated with the dental mirror, may be turned at a desired angle with ease and despatch and will positively preclude parts of the cheek from coming into contact with the mirror head and particularly the reflecting surface thereof.

The assembly chosen for illustration embodies the preferred form of the invention and comprises a mirror broadly designated by the numeral 10 and which includes a head 12 having the usual reflecting surface 14 on one side thereof. A shank 16 carries head 12 and a portion of this shank 16 is polygonal in cross section to present a plurality of flat surfaces 18. The guard comprises a body 20 having a laterally extending finger 22 at one end thereof and a socket 24 at the opposite end. A spring clip 26 near the zone of juncture between finger 22 and the intermediate portion of body 20 embraces shank 16 as illustrated in Fig. 4. This clip 26 is resilient in form and snaps into place when the parts are drawn together as shown in Fig. 1.

The socket 24 of body 20 receives the end of shank 16 opposite to head 12 and a detent 27 mounted on body 20 has a portion thereof extending into socket 24 to engage one of flat surfaces 18. This detent is in the nature of a trigger with a part projecting beyond a pintle 28 that serves as a support for the trigger and about which is wound a spring 30 to exert yielding force upon the inner portion of trigger 27 to the end that it may be held in engagement with one of surfaces 18. As body 20 is moved around the longitudinal axis of shank 18, spring 30 will yield, if enough force is applied to body 20, or if desired, trigger 27 may be engaged and released from its position against one of flat surfaces 18 to allow unrestricted and easy movement of body 20 for the purpose of adjusting finger 22 to a proper position above reflecting surface 14 of head 12. Socket 24 is large enough in diameter to receive the polygonal end of shank 16 and likewise, is sufficiently large to permit shank 16 to be moved thereinto prior to interengagement between shank 16 and clip 26.

The end of the polygonal portion of shank 16 presents a shoulder 32 that precludes accidental displacement of body 20 and mirror 10 and when the said parts are associated as shown in Figs. 1 and 2, limited longitudinal relative movement occurs only to the extent of the clearance between clip 26 and shoulder 32 and/or the end of polygonal portion of shank 16 and the end thereof which is projected into socket 24.

Finger 22 is curved as shown in Fig. 1 to present smooth surfaces to the cheek of the patient and the distance from the reflecting surface 14 to finger 22 is great enough to permit the operator to use the mirror without obstruction. The body 20 may be completely removed from mirror 10 for the purposes of sterilization if desired.

The physical form of the parts comprising the dental mirror and guard assembly just described may be altered without deviating from the scope of the appended claims.

Having thus described the invention, what I claim as new and desire to secure by Letters Patent is:

1. An instrument of the character described comprising a mirror having a head with a reflecting surface thereon and an attenuated shaft supporting the head; a finger swingably carried by the shank for movement across the reflecting surface of the head in spaced relation thereto; and structure for holding the finger in one of a number of positions with respect to the said head.

2. An instrument of the character described comprising a mirror having a head with a reflecting surface thereon and an attenuated shaft supporting the head; a finger swingably carried by the shank for movement across the reflecting surface of the head in spaced relation thereto; and a structure for yieldably holding the finger in one of a number of positions with respect to the said head.

3. An instrument of the character described comprising a mirror having a head with a reflecting surface thereon and an attenuated shaft supporting the head; a finger swingably carried by the shank for movement across the reflecting surface of the head in spaced relation thereto; and structure for holding the finger in one of a number of positions with respect to the said head, said finger being provided with means for quickly detachably engaging the shank of the mirror for movement about the axis of the shank thereof.

4. An instrument of the character described comprising a mirror having a head with a reflecting surface thereon and an attenuated shaft supporting the head; a body having receiving elements for the shank of the mirror; a finger on the body and disposed for movement across the reflecting surface of the head in spaced relation thereto; and structure for holding the finger in one of a number of positions with respect to the said head.

5. An instrument of the character described comprising a mirror having a head with a reflecting surface thereon and an attenuated shaft supporting the head; a body having a socket formed at one end thereof to receive the end of the said shank; a clip on the body to engage the shank at a point near to the opposite end thereof; an angularly disposed finger on the body in spaced relation to the reflecting surface of the head; and structure for holding the finger in one of a number of positions with respect to the said head as the body and its finger are rotated about the axis of the said shank.

EBEN L. SCOTT.

REFERENCES CITED

The following references are of record in the file of this patent:

UNITED STATES PATENTS

| Number | Name | Date |
| --- | --- | --- |
| 2,125,980 | Basil | Aug. 9, 1938 |

FOREIGN PATENTS

| Number | Country | Date |
| --- | --- | --- |
| 410,433 | German | Feb. 27, 1925 |